W. T. WALKER.
SHOCK ABSORBER.
APPLICATION FILED APR. 1, 1914.
1,135,084.
Patented Apr. 13, 1915.
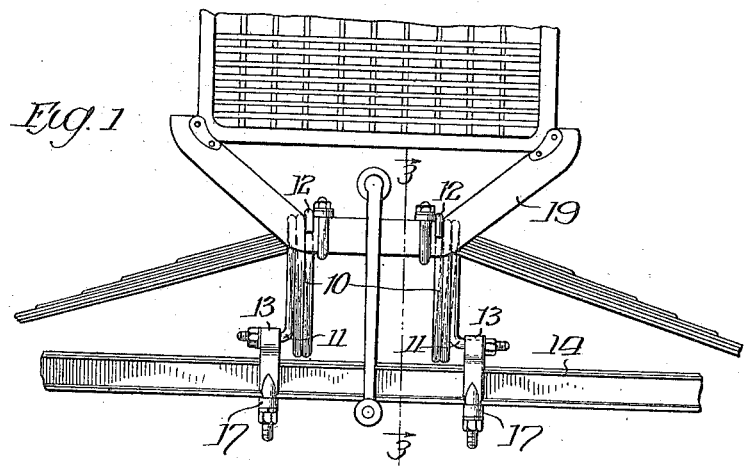
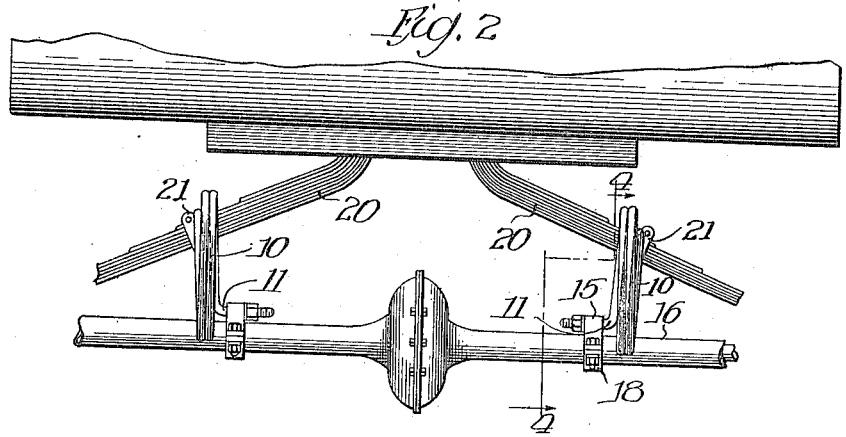
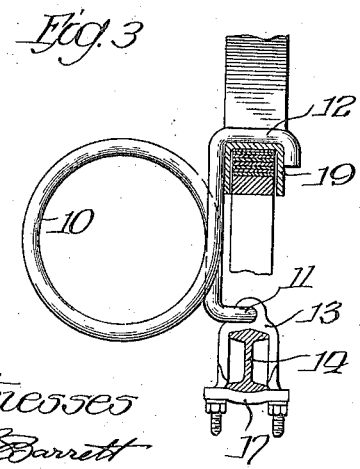
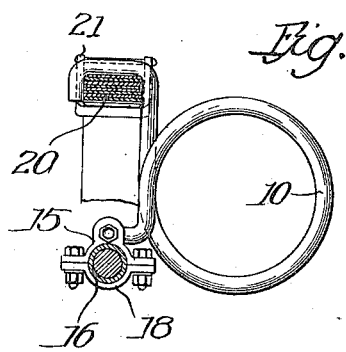
Witnesses
Inventor
Willard T. Walker
By Sutherland Kett Sutler
Attys.

UNITED STATES PATENT OFFICE.

WILLARD T. WALKER, OF RACINE, WISCONSIN, ASSIGNOR TO WALKER-MOORE MANUFACTURING COMPANY, OF RACINE, WISCONSIN, A CORPORATION OF WISCONSIN.

SHOCK-ABSORBER.

1,135,084.      Specification of Letters Patent.      Patented Apr. 13, 1915.

Application filed April 1, 1914. Serial No. 828,714.

*To all whom it may concern:*

Be it known that I, WILLARD T. WALKER, a citizen of the United States, residing at Racine, in the county of Racine and State of Wisconsin, have invented certain new and useful Improvements in Shock-Absorbers, of which the following is a specification.

My invention relates to shock absorbers for vehicles, and has particular reference to a novel torsion spring absorber.

In the construction and operation of motor cars it has been found desirable to employ devices auxiliary to the usual springs for minimizing the shocks due to unevenness of the road. The supporting springs on such cars partially eliminate such shocks, that is to say, the car-body is not jolted to any appreciable extent when a wheel rides up an obstruction, the jolt being experienced by the occupant when the wheel descends upon passing the obstruction, the car-body descending an instant later with an exaggerated spring compression. On the return motion of the springs the car body will be raised above its normal plane thus causing a reflex action of the springs, tending to separate the leaves thereof from each other. This is the action which causes breakage of the springs and excessive jolting to the occupants of the car. An auxiliary spring absorber will not minimize this condition unless such auxiliary spring acts only in one direction, that is, acts to retard the reverse action of the main springs.

My invention, therefore, contemplates the employment of a novel spring, such spring being so arranged as to act only to retard the separation of the axle and body of the car and to be inactive during the normal downward motion of the car-body.

A further object is to provide a spring of the torsion type, this type of spring providing a large capacity and resiliency.

The invention will be more readily understood by reference to the accompanying drawings, wherein—

Figure 1 is an elevation of the front end of a car of a well known type, having a pair of my novel shock absorbers applied thereto; Fig. 2 is an elevation of the rear of the same car; Fig. 3 is a section on line 3—3 of Fig. 1, and Fig. 4 is a section on the line 4—4 of Fig. 2.

It will be seen that my novel shock absorber consists in a spring 10 of a desired number of coils, terminating at one end in a portion 11 bent parallel with the axis of the spring, and the other end 12 in the form of a hook arranged in a plane corresponding to the surface plane of the coils. The end 11 is threaded and is adapted to be mounted in an aperture in a U-shaped clamp 13 shaped to fit over the front axle 14 in the case of the front set and in a clamp 15 adapted to fit over the rear axle 16 in the case of the rear set. These clamps are secured in place by means of transverse members 17, 18, respectively. The hooked end 12 of the spring is adapted to fit over a rigid portion 19 of the frame in the case of the front set as shown in Fig. 1 and over the springs 20 in the case of the rear set, as shown in Fig. 2. In the construction of Fig. 2 the hooked end is prevented from sliding down the springs 20 by reason of engagement with a clip 21 commonly used to bind the springs together at a point intermediate their ends. Of course, it will be understood that the point of engagement of the hooked ends is immaterial so long as the engagement is with a rigid or semi-rigid portion of the frame. It will be noted further that the engagement of one end of the spring with its corresponding member is positive in one direction only, that is, the torsion springs are active only in the case of a reverse flexure of the springs above the normal based on the usual load imposed on the springs.

In operation it will be understood that the shock absorbing springs are suitably connected to one portion of the car frame or axle, the other end of the spring being arranged in contact but not positively connected to a part of the vehicle. Preferably, the auxiliary springs will be very slightly compressed when the vehicle contains its normal or usual load. Thus when a wheel of the vehicle strikes an obstruction the vehicle springs are compressed and the auxiliary springs immediately go out of action not coming again into action until the car body and axle tend to separate beyond the normal. The auxiliary springs will then come into action and cushion or restrain such separation thus minimizing the shocks usually experienced.

It is obvious also that the form of the connection between the axle and car-body may be varied, it being understood that the torsion spring, however, is effective only in one direction.

While I have hereinabove described my auxiliary or supplemental cushioning or shock preventing springs as being operative in one direction only, it is nevertheless to be understood that when they are applied to the car they are under slight tension so that as the main springs are compressed the supplemental ones will not become unhooked or detached.

In applying the cushioning auxiliary springs they are preferably hooked over the main springs and then wound up or turned somewhat to permit attachment to the axle, thus putting them under a slight initial tension sufficient to prevent unhooking during movements of the main supporting springs.

I claim:

1. In a shock-absorber of the character described, the combination of a clamp equipped with means for securing it to a vehicle axle, and a coil torsion spring having one end fastened to said clamp and having its other end of hook form adapted to take over one of the body supporting-springs of the vehicle, substantially as described.

2. In a shock-absorber of the character described, the combination of a clamp equipped with means for securing it to a vehicle axle, a coil torsion spring having one end bent at right-angles to the plane of the spring and fastened to said clamp, the other end of the spring being in substantially the plane of the spring and bent to hook form, the hook being adapted to take over one of the body supporting-springs of the vehicle, substantially as described.

3. In a vehicle, the combination of a body, an axle, a supporting-spring for the body, a clamp secured to said axle, and an auxiliary coil torsion-spring, having one end fastened to said clamp and having its other end of hook form taking over said body supporting-spring, said auxiliary spring being normally under slight strain whereby its hook end will automatically follow the movements of the body supporting-spring and will be active substantially only to restrain reverse flexure of the supporting-spring, substantially as described.

4. In a vehicle, the combination of a body, an axle, a body supporting-spring, a clamp fastened to said axle, and an auxiliary shock-absorbing coil torsion-spring, having one end bent at substantially a right angle to the plane of the spring and fastened to said clamp, and having its other end of hook form in substantially the plane of the spring and taking over the body supporting-spring, said auxiliary spring being normally under slight strain whereby its hook end will automatically follow the movements of the body supporting-spring, and the auxiliary spring will be active substantially only to restrain reverse flexure of the supporting spring, substantially as described.

WILLARD T. WALKER.

Witnesses:
WM. A. WALKER,
W. H. WALKER.

Copies of this patent may be obtained for five cents each, by addressing the "Commissioner of Patents, Washington, D. C."